United States Patent [19]
Blackwell et al.

[11] Patent Number: 5,490,169
[45] Date of Patent: Feb. 6, 1996

[54] DECISION FEEDBACK EQUALIZER METHOD AND APPARATUS

[75] Inventors: Steven R. Blackwell; Richard L. Goodson, both of Huntsville, Ala.

[73] Assignee: Universal Data Systems, Inc., Huntsville, Ala.

[21] Appl. No.: 78,676

[22] Filed: Jun. 16, 1993

[51] Int. Cl.$^6$ .................................... H03H 7/30
[52] U.S. Cl. ................. 375/232; 375/229; 333/18; 364/724.19; 364/724.20
[58] Field of Search ............... 375/232, 14, 11–16; 333/18, 28; 364/724.19, 724.2

[56] References Cited

U.S. PATENT DOCUMENTS

| | | | |
|---|---|---|---|
| 4,528,676 | 7/1985 | Mein et al. | 375/14 |
| 4,615,025 | 9/1986 | Vry | 370/32 |
| 4,665,531 | 5/1987 | Aly | 375/94 |
| 4,821,286 | 4/1989 | Graczyk et al. | 375/17 |
| 5,052,023 | 9/1991 | Beichler et al. | 375/12 |

OTHER PUBLICATIONS

Cowan, C. F. N., and Grant, P. M. (Editors), *Adaptive Filters*, 1985, sec. 8.3.1., "Echo Cancellation for WAL2 Transmission," pp. 244–249, Prentice–Hall, Inc., Englewood Cliffs, New Jersey 07632.

Primary Examiner—Edward L. Coles, Sr.
Assistant Examiner—Madeleine Au Nguyen

[57] ABSTRACT

A decision feedback equalizer is suitable for use with a bipolar return-to-zero receiver. The equalizer determines an output Y(n) (160) based on a compensated received value X(n) (104) and a correction factor, D(n) (141). After receiving X(n), the equalizer retrieves a stored value D(n) corresponding to the k prior output values Y(n−1), . . . , Y(n−k) from a memory device (140). The equalizer then forms an equalized received value X'(n) (107) based on combining X(n) with D(n). The equalizer then determines the output value Y(n) based on comparing X'(n) with a positive threshold, V1 and a negative threshold, V2. When Y(n) is determined to be zero, the equalizer adjusts the stored correction value D(n) by a predetermined value, Δ, based on whether X'(n) is positive or negative.

22 Claims, 3 Drawing Sheets

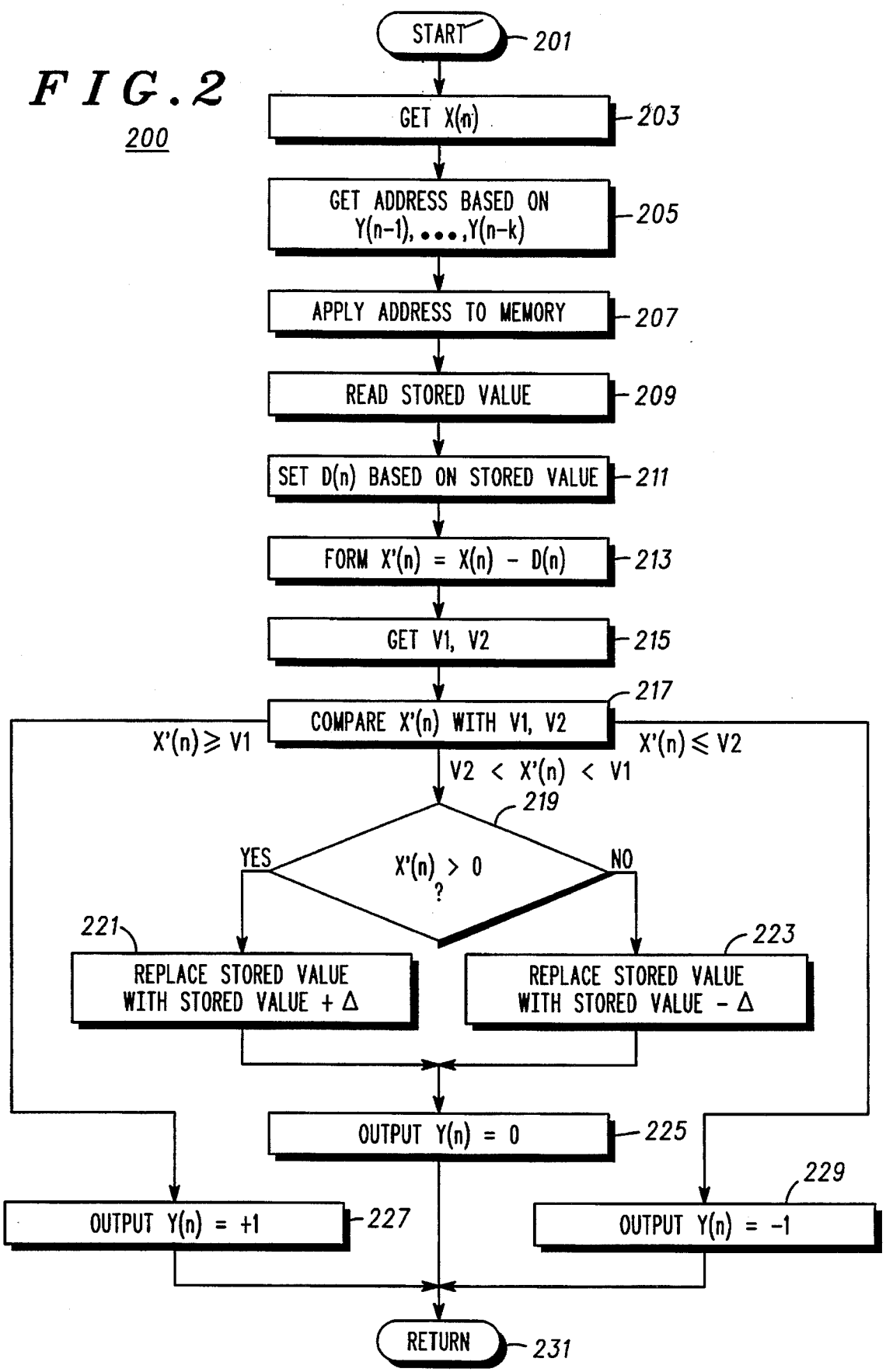

DECISION FEEDBACK EQUALIZER METHOD AND APPARATUS

FIELD OF THE INVENTION

This application relates to equalizers including, but not limited to, a decision feedback equalizer method and apparatus.

BACKGROUND OF THE INVENTION

Equalizer design has long been one of the most important considerations in the design of receivers suited for providing modern digital land-line-based data services such as, for example, DDS and T1. Both of these services use bipolar return-to-zero ("BRZ") signals for transmission. As is known, in a BRZ transmission system a "1" logical value is transmitted as either a positive or negative pulse while a "0" logical value is denoted by the absence of a pulse. Successive pulses alternate in polarity, giving rise to the term "alternate mark inversion," or "AMI." Certain conditions cause this rule to be violated but, under this rule, it is never legal to transmit two consecutive positive or negative pulses.

Conventional equalizers for BRZ signals operate by selecting an appropriate inverse line model for the given communication channel. If the line model is correct, the attenuation and phase distortion introduced by the line can be effectively compensated for in the received signal. A noise limiting filter is sometimes added as well to eliminate out-of-band noise.

The problem with these conventional equalizer structures is that their performance is limited by the accuracy of the line models. Impairments such as bridge taps and wire size transitions sometimes cause a line to have characteristics that are not predicted well by normal wire line models. One solution to this problem would be to generate line models that take into account every known line impairment combination. It is easy to see that this approach becomes impractical quickly as more and more impairment sources are considered. A better approach is to build a receiver structure that is capable of learning the line impairments and compensating for them.

BRIEF DESCRIPTION OF THE DRAWINGS

FIG. 2 is a flow diagram for FIG. 1.

DESCRIPTION OF THE PREFERRED EMBODIMENT

Figure 1:
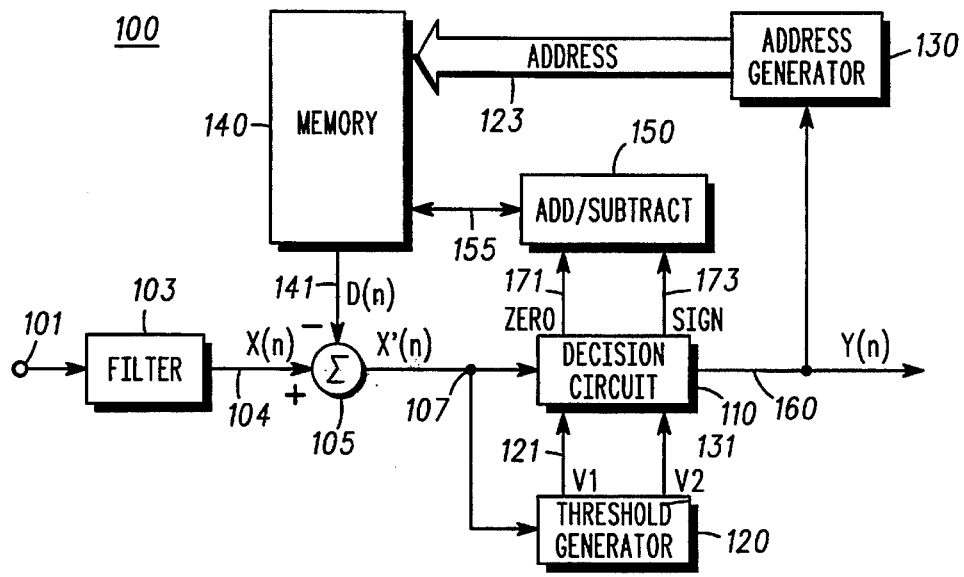
FIG. 1 is a block diagram that shows a receiver including a first embodiment of a decision feedback equalizer apparatus in accordance with the present invention.

FIG. 1 shows a receiver for BRZ signals that uses a conventional analog equalizer 103 followed by a first embodiment of a decision feedback equalizer, in accordance with the present invention. This system compensates the received signal 101 for the impairments that were introduced by the transmission line so that the decision mechanism is capable of making a larger percentage of correct decisions.

The first section of the receiver, i.e., the filter 103, is no different from typical analog equalization systems. For example, the filter 103 may be that of McGary et al., U.S. Pat. No. 4,759,035, which patent is hereby incorporated by reference. Or the filter 103 may be that of Beichler et al., U.S. Pat. No. 5,052,023, which patent is hereby incorporated by reference. Thus, the received signal 101 is applied to an appropriately-selected analog filter that has approximately an inverse characteristic of the communication channel. This filter adds gain and phase corrections to the received signal to compensate for line impairments, producing the compensated received signal, $X(n)$, 104. As signals are derived only at predetermined baud intervals, the $X(n)$ signal at point 104 may be viewed as a sampled input signal comprising a series of sequential samples at the baud intervals.

A correction value $D(n)$ 141 is generated each baud to compensate for the residual effects of previous bauds that the analog filter 103 was not completely able to remove. In one embodiment, the last four received symbols are used to generate $D(n)$, although any number may be used.

As shown, $X(n)$ and $D(n)$ are combined by a summing device or junction 105 to form an equalized received signal $X'(n)$ 107. The signal $X'(n)$ is applied to a decision circuit 110. The decision circuit 110, in turn, determines the value of the output value $Y(n)$ 160 by comparing $X'(n)$ with a first predetermined value, V1, element 121, and a second predetermined value, V2, element 131. The values V1 and V2 are provided by a threshold generator 120, based on the value $X'(n)$. When $X'(n) \geq V1$, the decision circuit 110 determines that $Y(n)$ equals a first symbol. When $X'(n) \leq V2$, the decision circuit 110 determines that $Y(n)$ equals a second symbol. When $V2 < X'(n) < V1$, the decision circuit 110 determines that $Y(n)$ equals a third symbol. In one embodiment, the first symbol equals +1, the second symbol equals −1, and the third symbols equals 0.

The correction factor $D(n)$ 141 is generated by the memory device 140 under control of an address value 123. The address value 123, in turn, is generated by an address generator 130. The address generator 130 generates the address value 123 based on a predetermined number, say k, of preceding output values, thus, $Y(n-1), \ldots, Y(n-k)$.

It will be apparent to those skilled in the art that the memory device 140 comprises a stored correction value $D(n)$ 141 for each possible combination of k consecutive output values at the output 160, thus $Y(n-1), \ldots, Y(n-k)$, each stored value being selectively addressable by the address value 123.

In one embodiment, k equals 4, and thus the address generator 130 generates the address value 123 based on the 4 preceding output values, $Y(n-1), Y(n-2), Y(n-3), Y(n-4)$.

Each time an output value $Y(n)$ equal to zero is generated, the stored value of $D(n)$ is adjusted in order to keep $X'(n)$ as close to zero as possible. When the decision circuit 110 determines that $Y(n)$ equals zero, the circuit 110 activates the addition/subtraction circuit 150 via the lead designated ZERO, element 171. The decision circuit 110 also compares $X'(n)$ with zero; the circuit 110 then informs the addition/subtraction circuit 150 of the sign of the comparison by the lead designated SIGN, element 173. When $X'(n) > 0$, the addition/subtraction circuit 150 operates to replace the stored value $D(n)$ with $D(n)$ plus a predetermined value, $\Delta$, via the path 155. Conversely, when $X'(n) < 0$, the addition/subtraction circuit 150 operates to replace the stored value $D(n)$ with $D(n)$ minus $\Delta$.

Returning now to the threshold generator 120, in one embodiment the generator 120 may generate V1 based on the maximum positive value of $X'(n)$. Likewise, the generator 120 may generate V2 based on the maximum negative value of $X'(n)$.

Referring now to FIG. 2, there is shown a flow diagram for FIG. 1. The process starts at 201, then proceeds to get the value X(n), step 203.

The process then gets the address value 123 from the address generator 130 based on Y(n−1), . . . , Y(n−k), step 205.

The process next applies the address value 123 to the memory device 140, step 207.

The process next reads the stored value, step 209, and sets D(n) 141 based on the stored value, step 211.

The process next forms X'(n) equal to X(n) minus D(n), step 213.

The process next gets the predetermined values, V1 and V2, step 215, and then compares X'(n) with V1 and V2, step 217.

If X'(n)≧V1, the process sets Y(n) equal to +1, step 227. The process then returns, step 231.

If X'(n)<V2, the process sets Y(n) equal to −1, step 229. The process then returns, step 231.

If V2<X'(n)<V1, the process then goes to step 219, where it determines if X'(n)>0. If the determination is positive, the process goes to step 221, where it replaces the stored value with the stored value plus Δ., and then goes to step 225. Conversely, if the determination is negative, the process goes to step 223, where it replaces the stored value with the stored value minus Δ., and then goes to step 225.

In step 225, the process sets Y(n) equal to zero. The process then returns, step 231.

Figure 3:
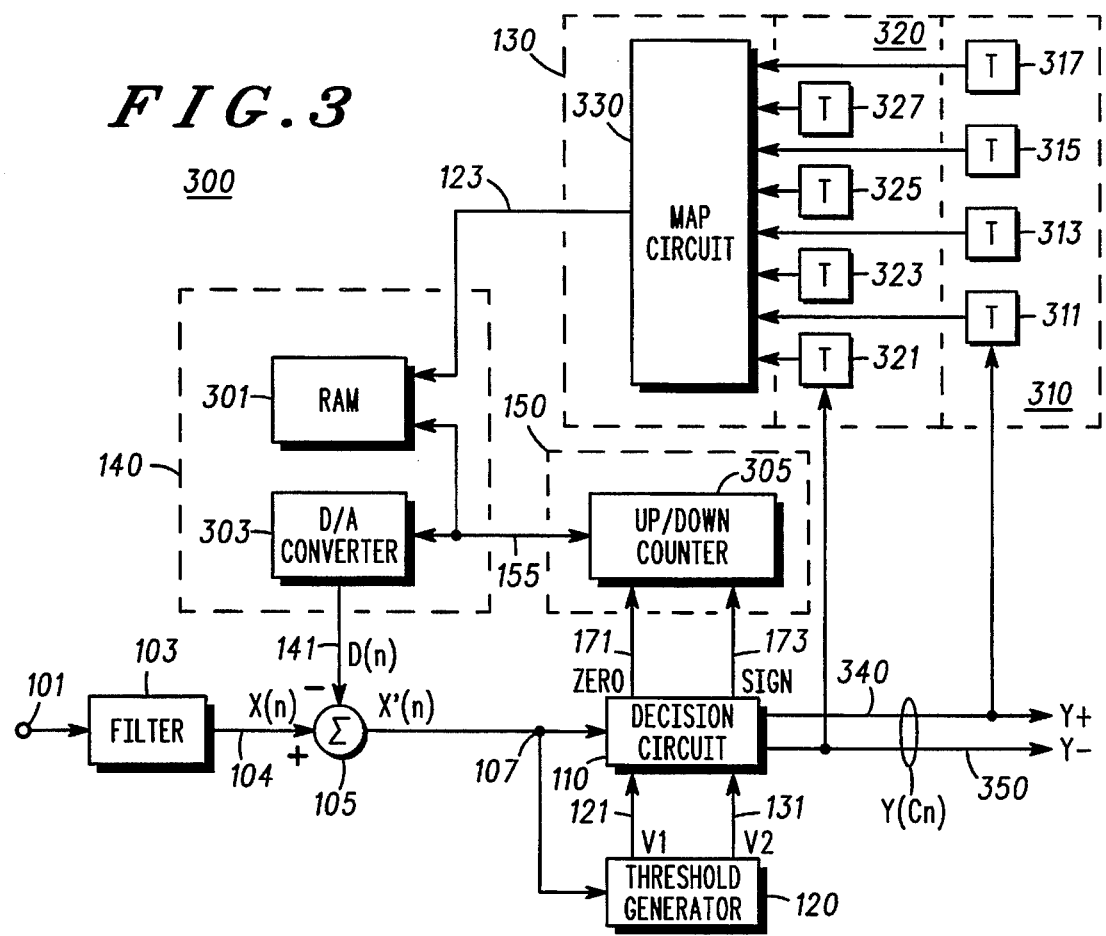
FIG. 3 is a block diagram that shows a receiver including a second embodiment of a decision feedback equalizer in accordance with the present invention.

Referring to FIG. 3, there is shown a receiver including a second embodiment of a decision feedback equalizer, in accordance with the present invention. In this embodiment, the output value Y(n) comprises a first signal Y+, element 340, and a second signal Y−, element 350. The correspondence between Y(n) and the signals Y+, Y− is as follows:

| $Y^+$ | $Y^-$ | Y(n) symbol |
|---|---|---|
| 1 | 0 | +1 |
| 0 | 0 | 0 |
| 0 | 1 | −1 |

Also in this embodiment, the memory device 140 comprises a random access memory ("RAM") unit 301, coupled to a digital to analog converter ("D/A") unit 303. Also in this embodiment, the addition/subtraction unit 150 comprises an up/down counter 305.

In one embodiment, the stored values in the RAM unit 301 vary from plus (+) 128 to negative (−) 128, and the up/down counter 305 is arranged to increment or decrement these stored values by a Δ equal to one (1). In another embodiment, the Δ may vary or be adaptive based on one or more variables including, for example, an error value and time.

Referring still to FIG. 3, it is seen the address generator 130 comprises a first shift register 310, a second shift register 320, and a map circuit 330. The first shift register 310 comprises a first delay line with four stages designated 311, 313, 315, and 317, each stage having a delay T, where T is the inverse of the baud time. The contents of the stages 311, 313, 315, and 317 respectively comprise the last four (4) outputs of the signal Y+ 340, thus, Y+(n−1), Y+(n−2), Y+(n−3) and Y+(n−4). This information is tabulated below:

| Delay Line Element No. | Contents/Output |
|---|---|
| 311 | Y+(n−1) |
| 313 | Y+(n−2) |
| 315 | Y+(n−3) |
| 317 | Y+(n−4) |

Likewise, the second shift register 320 comprises a second delay line with four stages designated 321, 323, 325, and 327, each stage having a delay T. Also, the contents of the stages 321, 323, 325, and 327 respectively comprise the last four (4) outputs of the signal Y− 350, thus, Y−(n−1), Y−(n−2), Y−(n−3) and Y−(n−4). This information is tabulated below:

| Delay Line Element No. | Contents/Output |
|---|---|
| 321 | Y−(n−1) |
| 323 | Y−(n−2) |
| 325 | Y−(n−3) |
| 327 | Y−(n−4) |

As shown, the eight preceding output values Y+(n−1), Y+(n−2), Y+(n−3), Y+(n−4), Y−(n−1), Y−(n−2), Y−(n−3) and Y−(n−4) are input to the map circuit 330.

The purpose of the map circuit 330 is to process the foregoing eight preceding output values to form an address value 123 having a reduced number of bits. Hence, in the absence of the map circuit 330, the address value 123 would include 8 bits, one bit for each output value Y+(n−1), Y+(n−2), Y+(n−3), Y+(n−4), Y−(n−1), Y−(n−2), Y−(n−3) and Y−(n−4). However, the map circuit 330 takes advantage of some of the limitations imposed by the BRZ transmission scheme. Thus, BRZ signalling dictates that succeeding 1's are sent with alternating polarities. As a result, the patterns 1, 1 and −1, −1 are illegal. Moreover, only seven (7) combinations are possible for two successive symbols instead of nine.

In one embodiment, the mapping function performed by the map circuit 330 uses three (3) bits (eight possible values) to represent two symbols. This is reasonably efficient, and the function is very easy to implement. The equations for the mapping function are as follows, where A5, . . . , A0 are the six (6) RAM address bits comprising signal 123:

A5=Y−(n−4) OR Y+(n−3)
A4=Y−(n−4) OR Y−(n−3)
A3=Y+(n−4) OR Y+(n−3)
A2=Y−(n−2) OR Y+(n−1)
A1=Y−(n−2) OR Y−(n−1)
A0=Y+(n−2) OR Y+(n−1)

Figure 4:
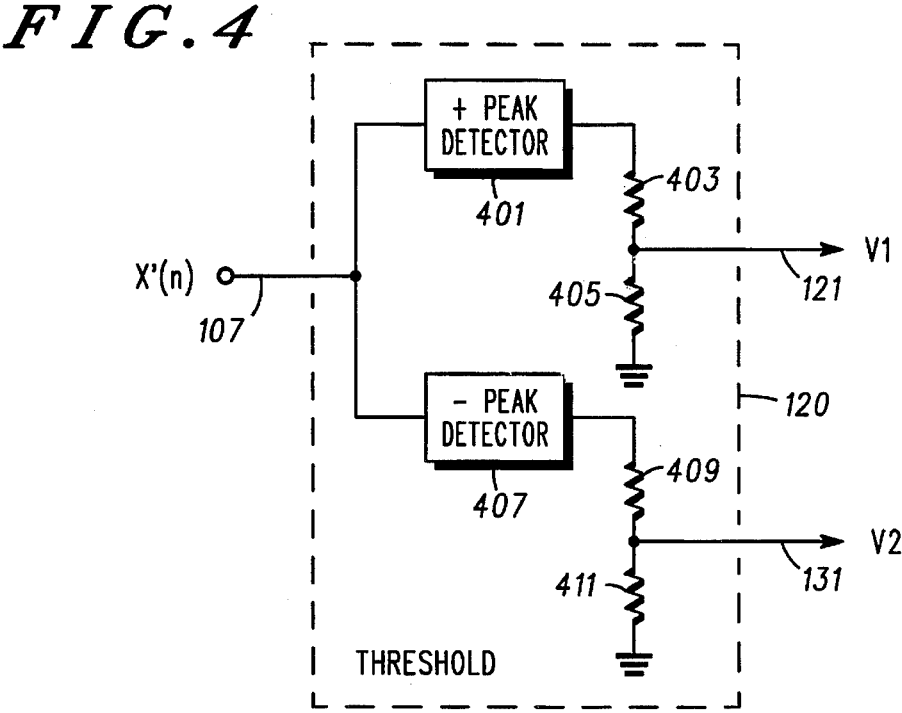
FIGS. 4–5 show further detail for FIG. 3.

One embodiment of the threshold generator 120 is shown in FIG. 4. In one embodiment, the peak detectors 401 and 407 may be fashioned with simple diode and capacitor circuits arranged to sample and hold the peak positive and negative values of the equalized received signal X'(n), element 107. Also in one embodiment, the values of the resistors 403, 405, 409, and 411 are equal. With this arrangement, the positive threshold V1, element 121, is set to one-half (0.5) the maximum positive value of X'(n), and the negative threshold V2, element 131, is set to one-half (0.5) the maximum negative value of X'(n).

In another embodiment, the threshold generator 120 sets the thresholds V1, V2 based on the compensated received signal X(n), element 104. This may be more convenient in some implementations. The penalty for doing this is a small degradation in the accuracy of the decision thresholds, thus yielding a slightly worse bit error rate.

Figure 5:
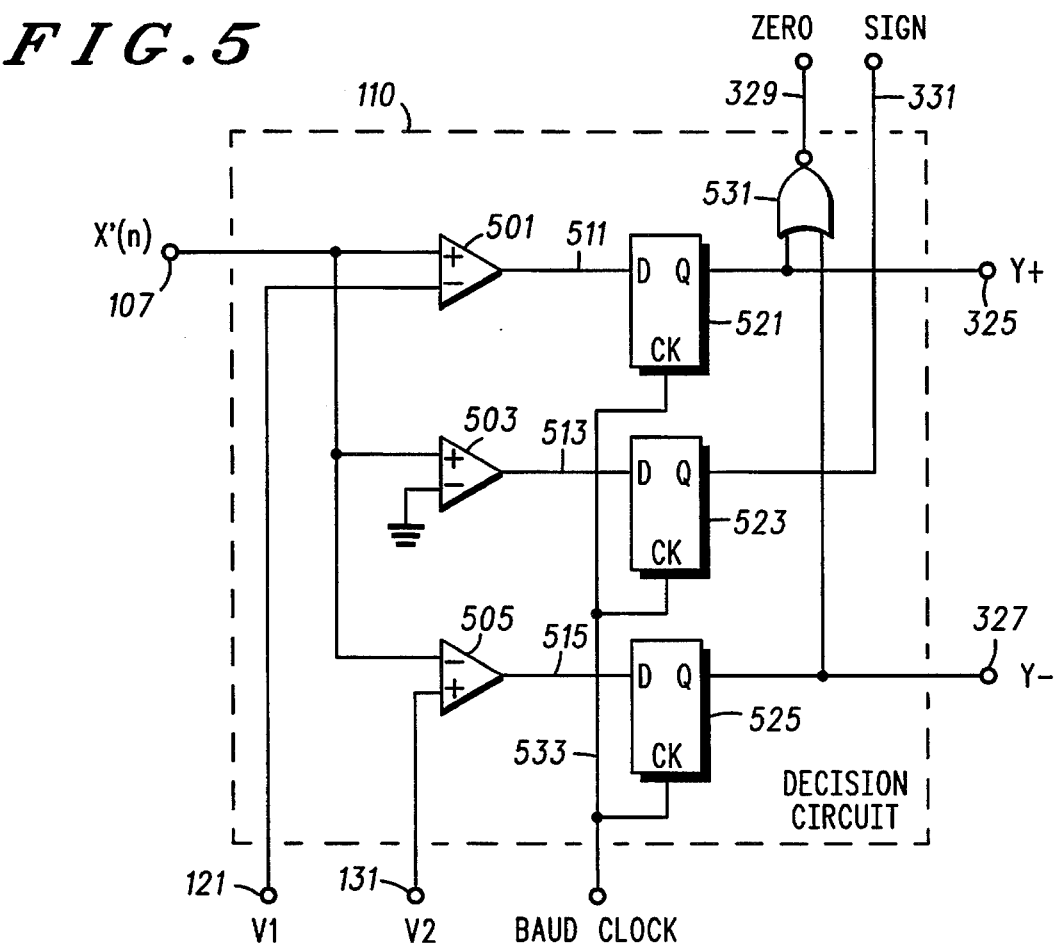

One embodiment of the decision circuit is shown in FIG. 5. As shown, the equalized received signal X'(n) is input to a first comparator 501, a second comparator 503, and a third comparator 505. Also as shown, the first comparator 501, the second comparator 503, and the third comparator 505 are respectively coupled to a first flip-flop 521, a second flip-flop 523, and a third flip-flop 525. Also, the first flip-flop 521, the second flip-flop 523, and the third flip-flop 525 are clocked by a baud clock signal 523.

As shown, the comparator 501 compares X'(n) with the positive threshold V1, element 121. When X'(n) exceeds V1, the comparator 501 presents a logic 1 signal to the flip-flop 521 via a channel 511. Otherwise, the comparator 501 presents a logic 0 signal to the flip-flop 521. After being activated by the baud clock signal 533, the flip-flop 521 presents the output signal Y+ at lead 325.

Also as shown, the comparator 505 compares X'(n) with the negative threshold V2, element 131. When X'(n) is less than V2, the comparator 505 presents a logic 1 signal to the flip-flop 525 via a channel 515. Otherwise, the comparator 505 presents a logic 0 signal to the flip-flop 525. After being activated by the baud clock signal 533, the flip-flop 525 presents the output signal Y− at lead 327.

Still referring to FIG. 5, the output signal Y+ and the output signal Y− are coupled to a NOR gate 531. When the output signal Y+ and the output signal Y− both equal logic 0, the gate 531 will output a logic 1 signal. As a result, the gate 531 presents the output signal ZERO at lead 329.

Also, the comparator 503 compares X'(n) with signal equal to zero volts, i.e., ground. When X'(n) is greater than 0, the comparator 503 presents a logic 1 signal to the flip-flop 523 via a channel 513. Otherwise, the comparator 503 presents a logic 0 signal to the flip-flop 523. After being activated by the baud clock signal 533, the flip-flop 523 presents the output signal SIGN at lead 331.

Returning now to FIG. 1, it is noted the signal X(n) 104 is applied to a positive terminal of the summing device 105 while the correction factor D(n) 141 is applied to a negative terminal of the summing device 105 to form the resulting signal X'(n) 107. Thus, with respect to FIG. 1 it may be said that X'(n) is formed by subtracting D(n) from X(n). However, it will be appreciated that if the signs of the D(n) factors were reversed, or if the phase angles of the factors were rotated by 180 degrees, or if the factors were multiplied by minus 1, or if the factors were processed by another similar adjusting function prior to storage in the memory device 140, then it would be possible to apply the resulting adjusted correction factors (not shown) to a second positive terminal (not shown) of the summing device 105. In this case, it could be said that X'(n) is formed by adding D(n) to X(n). As a decision feedback equalizer method and apparatus, in accordance with the present invention contemplates all such equivalent arrangements, it may be generally stated that, in accordance with the teachings of the present invention, X'(n) is formed by combining D(n) with X(n).

In summary, there is disclosed a decision feedback equalizer method and apparatus, in accordance with the present invention, that is suitable for use with a BRZ receiver. In accordance with the present invention, a decision feedback equalizer determines an output Y(n) 160 based on a compensated received value X(n) 104 and a correction factor, D(n) 141. After receiving X(n), the decision feedback equalizer retrieves a stored value D(n) corresponding to the k prior output values Y(n−1), . . . , Y(n−k) from a memory device 140. The decision feedback equalizer then forms an equalized received value X'(n) 107 based on combining X(n) with D(n). The decision feedback equalizer then determines the output value Y(n) based on comparing X'(n) with a positive threshold, V1, and a negative threshold, V2. When Y(n) is determined to be zero, the decision feedback equalizer adjusts the stored correction value D(n) by a predetermined value, Δ, based on whether X'(n) is positive or negative.

One major difficulty in the design of decision feedback equalizers for BRZ systems is that these systems do not use scramblers to randomize data. In fact, long periods of repeating sequences are quite common. Traditional decision feedback adaptation algorithms, such as least means squared, require random data both for proper training and for maintaining proper convergence. In contrast, a decision feedback equalizer method and apparatus, in accordance with the present invention, has the advantage that does not require that the data be randomized. Furthermore, a decision feedback method and apparatus, in accordance with the present invention, is also capable of equalizing non-linear line impairments, something that most prior art algorithms cannot do.

While the concept of a digital loop-up table distortion canceller has existed in the prior art, see, for example, *Adaptive Filters,* edited by C. F. N. Cowan and P. M. Grant, section 8.3.1, "Echo Cancelation for WAL2 Transmission," pp. 244–249, Prentice Hall, Englewood Cliffs, N.J., 1985, it is believed that a decision feedback equalizer method and apparatus in accordance with the present invention represents a novel application of this concept.

While various embodiments of a decision feedback equalizer method and apparatus, in accordance with the present invention, have been described hereinabove, the scope of the invention is defined by the following claims.

What is claimed is:

1. In a decision feedback equalizer that is part of a receiver of bipolar return-to-zero (BRZ) signals, the receiver producing compensated received signals, the decision feedback equalizer having an input, an output and a memory, the input receiving the compensated received signals, the compensated received signals having a series of values X(n), where n=1, 2, 3, . . . , the output producing an output signal, the output signal having a series of corresponding output values, Y(n), the memory comprising a stored value for each possible combination of k consecutive output values, where k is a predetermined number Of preceding output values, each stored value being selectively addressable by an address value, a method for determining an output value based on a given input value, the method comprising the following steps:

(a) receiving X(n);

(b) forming an address value based on the k prior output values, thus, Y(n−1), . . . , Y(n−k);

(c) retrieving a stored value based on the address value;

(d) forming a correction factor, D(n), based on the stored value;

(e) combining X(n) and D(n) to form an equalized received signal X'(n);

(f) comparing X'(n) with a first predetermined value, V1, and a second predetermined value, V2;

(g) determining Y(n) based upon the results of step (f);

(h) determining that Y(n) equals a second symbol when X'(n)≦ V2;

(i) determining that Y(n) equals a third symbol when V2<X'(n)< V1;

(j) comparing X'(n) with zero when V2<X'(n)<V1; and (k) replacing the stored value with the stored value plus a predetermined value, $\Delta$, when $X'(n)>0$.

2. The method of claim 1, including the step of:

(1) replacing the stored value with the stored value minus $\Delta$ when $X'(n)<0$.

3. The method of claim 2, including a step of determining V1 based on the maximum positive value of $X'(n)$.

4. The method of claim 2, including a step of processing the k preceding output values to form an address value having a reduced number of bits.

5. The method of claim 3, including a step of determining V2 based on the maximum negative value of $X'(n)$.

6. The method of claim 5, wherein k equals 4.

7. The method of claim 6, wherein the input is based on a bipolar return-to-zero waveform.

8. The method of claim 7, wherein the first symbol equals +1, the second symbol equals −1, and the third symbol equals 0.

9. The method of claim 8, where step (e) is performed by a summing junction.

10. The method of claim 9, where step (b) is performed using at least one delay line having k stages.

11. The method of claim 10, where step (k) is performed using an up-down counter.

12. The method of claim 11, where step (l) is performed using an up-down counter.

13. The method of claim 12, where the stored values are stored in digital form and the forming step (d) includes a step of converting the stored value to analog form using an digital-to-analog converter.

14. The method of claim 13, where V1 equals one-half the maximum positive value of $X'(n)$.

15. The method of claim 14, where V2 equals one-half the maximum negative value of $X'(n)$.

16. The method of claim 15, including a preceding step of analog filtering.

17. In a decision feedback equalizer that is part of a receiver of BRZ signals, the receiver producing a compensated received signals, the decision feedback equalizer comprising an input, an output, and a memory, the input receiving the compensated received signals, the compensated received signals comprising a series of input values $X(n)$, where $n=1, 2, 3, \ldots$, the output producing an output signal, the output signal having a a series of corresponding output values, $Y(n)$, and the memory comprising a stored correction value for each possible combination of k consecutive output values, where k is a predetermined number of preceding output values, a method for determining an output value based on a given input value comprising the steps of:

(a) receiving $X(n)$;

(b) retrieving the stored correction value corresponding to $Y(n-1), \ldots, Y(n-k)$;

(c) forming an equalized received signal $X'(n)$ based on combining $X(n)$ with the stored correction value corresponding to $Y(n-1), \ldots, Y(n-k)$;

(d) comparing $X'(n)$ with a first predetermined value, V1, and a second predetermined value, V2;

(e) when $X'(n)>V1$, determining that $Y(n)$ equals a first symbol.

(f) when $X'(n)<V2$, determining that $Y(n)$ equals a second symbol;

(g) when $V2<X'(n)<V1$, determining that $Y(n)$ equals a third symbol;

(h) when $V2<X'(n)<V1$, comparing $X'(n)$ with zero, 0;

(i) when $X'(n)>0$, incrementing the stored value corresponding to $Y(n-1), \ldots, Y(n-k)$ by a predetermined value, $\Delta$.

18. The method of claim 17, including the step of:

(j) when $X'(n)<0$, decrementing the stored value corresponding to $Y(n-1), \ldots, Y(n-k)$ by $\Delta$.

19. The method of claim 18, including a step of determining V1 based on the maximum positive value of $X'(n)$.

20. The method of claim 19, including a step of determining V2 based on the maximum negative value of $X'(n)$.

21. The method of claim 20, wherein k equals 4.

22. The method of claim 21, wherein the first symbol equals +1, the second symbol equals −1, and the third symbol equals 0.

* * * * *